(12) United States Patent
Pan et al.

(10) Patent No.: US 11,940,087 B2
(45) Date of Patent: Mar. 26, 2024

(54) ADJUSTING STRUCTURE AND STAND FOR PHOTOGRAPHIC APPARATUS

(71) Applicants: Guochen Pan, Guangdong (CN); Jun Yang, Guangdong (CN); Hong Wang, Guangdong (CN)

(72) Inventors: Guochen Pan, Guangdong (CN); Jun Yang, Guangdong (CN); Hong Wang, Guangdong (CN)

(73) Assignee: Shenzhen Anymore Technology Limited, Linghua District (CN)

( * ) Notice: Subject to any disclaimer, the term of this patent is extended or adjusted under 35 U.S.C. 154(b) by 0 days.

(21) Appl. No.: 17/983,667

(22) Filed: Nov. 9, 2022

(65) Prior Publication Data

US 2024/0052967 A1   Feb. 15, 2024

(30) Foreign Application Priority Data

Aug. 12, 2022   (CN) .......................... 202210969017.2

(51) Int. Cl.
| | |
|---|---|
| *F16M 11/00* | (2006.01) |
| *F16M 11/04* | (2006.01) |
| *F16M 11/32* | (2006.01) |
| *G03B 17/56* | (2021.01) |

(52) U.S. Cl.
CPC ............. *F16M 11/04* (2013.01); *F16M 11/32* (2013.01); *G03B 17/561* (2013.01)

(58) Field of Classification Search
None
See application file for complete search history.

(56) References Cited

U.S. PATENT DOCUMENTS

| | | | | | |
|---|---|---|---|---|---|
| 2,323,473 | A | * | 7/1943 | Korling | .............. F16M 11/2014 248/183.1 |
| 2,374,021 | A | * | 4/1945 | Korling | .................. F16M 11/28 248/170 |
| 4,697,772 | A | * | 10/1987 | Kosugi | .............. F16M 11/2064 264/293 |
| 5,267,712 | A | * | 12/1993 | Shen | .................. F16M 11/2064 396/428 |
| 5,421,549 | A | * | 6/1995 | Richards | ................ F16M 11/10 396/419 |
| 5,524,968 | A | * | 6/1996 | Stoltz | ........................ A47C 9/10 297/344.21 |
| 7,011,280 | B2 | * | 3/2006 | Murray | ................ G01C 15/002 396/419 |

(Continued)

*Primary Examiner* — Steven M Marsh
(74) *Attorney, Agent, or Firm* — Justin Lampel

(57) ABSTRACT

The invention discloses an adjusting structure and a stand for photographic apparatus. The adjusting structure includes a first adjusting rod, a first connecting member, a second connecting member, a second adjusting rod, a first locking member and a supporting member. The first connecting member is fixedly connected with the first adjusting rod, the second connecting member is rotationally connected with the first connecting member and is provided with a first mounting hole, wherein the second connecting member can be rotated relative to the first connecting member to adjust an included angle with the first connecting member, the second adjusting rod is penetrated through the first mounting hole and movablely connected with the first adjusting rod, and can be moved relative to the first adjusting rod along a straight direction.

10 Claims, 9 Drawing Sheets

(56) References Cited

U.S. PATENT DOCUMENTS

| | | | | |
|---|---|---|---|---|
| 10,907,809 B2* | 2/2021 | Harvey | ............... | F21V 21/06 |
| 11,036,115 B2* | 6/2021 | Li | ............... | F16M 11/2071 |
| 11,221,544 B1* | 1/2022 | York | ............... | F16M 11/24 |
| 11,480,290 B2* | 10/2022 | Johnson, Sr. | ............... | F16M 11/16 |
| 2005/0121590 A1* | 6/2005 | Vanover | ............... | F16M 11/16 |
| | | | | 248/170 |
| 2005/0151036 A1* | 7/2005 | Speggiorin | ............... | F16M 11/32 |
| | | | | 248/177.1 |
| 2015/0076296 A1* | 3/2015 | Yang | ............... | F16M 11/32 |
| | | | | 248/163.2 |

* cited by examiner

ADJUSTING STRUCTURE AND STAND FOR PHOTOGRAPHIC APPARATUS

TECHNICAL FIELD

The present application relates to the technical field of photographic auxiliary equipment, and more particularly to an adjusting structure and a stand for photographic apparatus.

BACKGROUND

A tripod is a common auxiliary tool in photography and photo taking, which is used to stabilize video cameras, cameras and other photographic apparatus, with the tripod better quality shooting effects can be achieved. The tripod generally includes three legs and a cloud platform at the top of the legs for supporting the photographic equipment or instrument. However, with the diversification of shooting scenes, more shooting angles are needed, but the angle adjustment of the current tripod is in single direction, and thus a tripod can be adjusted in multi-directions is urgently needed.

SUMMARY

In view of the shortcomings of the prior art, an adjusting structure and a stand for photographic apparatus are provided by the embodiments of the present invention to solve the technical problem that the angle adjustment of the tripod is single in the prior art.

An adjusting structure according to embodiments of the present invention is used for a stand for photographic apparatus, wherein a first adjusting rod, a first connecting member, a second connecting member, a second adjusting rod, a first locking member and a supporting member. The first connecting member is fixedly connected with the first adjusting rod; the second connecting member is rotationally connected with the first connecting member and is provided with a first mounting hole, wherein the second connecting member is rotatable relative to the first connecting member to adjust an angle relative to the first connecting member; the second adjusting rod penetrates through the first mounting hole and is movablely connected with the second connecting member, and movable relative to the first adjusting rod along a straight direction; the first locking member is connected with the second connecting member for locking the second adjusting rod so as to limit the second adjusting rod to move along the straight direction; and the supporting member is connected to an end of the second adjusting rod away from the first adjusting rod.

In some embodiments, the adjusting structure further comprises a second locking member, and the first connecting member includes a first body and a first boss extending from the first body, the first body is provided with a second mounting hole and a first locking hole communicating with the second mounting hole, wherein one end of the first adjusting rod is extended into the second mounting hole, and the second locking member penetrates through the first locking hole for locking the first adjusting rod and the first body; the first boss is provided with a first connecting hole for connecting with the second connecting member.

In some embodiments, the adjusting structure further includes connecting assembly, and the second connecting member includes a second body and a second boss extending from the second body, the second body is provided with the first mounting hole; the second boss is provided with a second connecting hole; wherein the connecting assembly penetrates through the first connecting hole and the second connecting hole and connects the first boss with the second boss rotationally.

In some embodiments, the connecting assembly includes a connecting pin, a locking knob and a spring, the connecting pin comprising a first end and a second end, wherein the first end of the connecting pin penetrates through the first connecting hole and the second connecting hole; the locking knob is connected with the first end of the connecting pin; the spring is arranged in the first connecting hole or the second connecting hole and is sleeved on the connecting pin; wherein the second end of the connecting pin is in contact with a side of the second boss away from the first boss, and the locking knob is in contact with a side of the first boss away from the second boss; or, the second end of the connecting pin is in contact with a side of the first boss away from the second boss, and the locking knob is in contact with a side of the second boss away from the first boss.

In some embodiments, a first meshing tooth is formed on a surface of the first boss facing to the second boss, a second meshing tooth is formed on a surface of the second boss facing to the first boss, and the first meshing tooth is matched with the second meshing tooth for locking the first connecting member and the second connecting member.

In some embodiments, a first friction plate is provided on the a surface of the first boss facing to the second boss, a second friction plate is provided on the a surface of the second boss facing to the first boss; and the first friction plate is matched with the second friction plate for increasing a friction force between the first connecting member and the second connecting member.

In some embodiments, the first locking member includes a hand wheel and a locking piece, the hand wheel is connected with the second connecting member by thread, the locking piece is arranged within the first mounting hole of the second connecting member and is located between the second connecting member and the second adjusting rod; a top end of the locking piece is in contact with a top end of the hand wheel, and a gap between the locking piece and the second adjusting rod is adjusted by rotating the hand wheel.

In some embodiments, a second locking hole communicating with the first mounting hole is formed on the second connecting member, the first locking member is a locking screw, and the locking screw penetrates through the second locking hole and locks the second connecting member and the second adjusting rod.

In some embodiments, the second connecting member includes a first clamping arm and a second clamping arm located on both sides of the second adjusting rod, one end of the first clamping arm is connected with one end of the second clamping arm, and the other end of both the first and second clamping arm is provided with a third locking hole; the first locking member is a locking screw, and the locking screw passes through the two third locking holes and locks the first clamping arm and the second clamping arm.

In some embodiments, the second mounting hole is formed on the first connecting member, the adjusting structure further comprises a third connecting member, the third connecting member is arranged within the second mounting hole and is provided with a third mounting hole, the first adjusting rod penetrates the third mounting hole.

In some embodiments, the supporting member comprises a supporting body and a stud, the supporting body is fixedly connected with the second adjusting rod, and the stud is extended out of the supporting body.

In some embodiments, the adjusting structure further comprises a connecting base, an adapter and a supporting platform, the connecting base is arranged on a side of the supporting member away from the second adjusting rod and is provided with a mounting slot; the adapter includes a sphere and a rod body, wherein the sphere is arranged into the mounting slot and rotatable relative to the connecting base, the rod body is connected with the sphere; the supporting platform is connected with the rod body.

A stand for photographic apparatus according to embodiments of the present invention comprises a main stand and the adjusting structure mentioned in any one of the above-mentioned embodiments, and the adjusting structure is installed on the main stand.

In the adjustment structure and the stand for photographic apparatus according to the embodiment of the present invention, the second adjusting rod can be moved relative to the first adjusting rod along a straight direction, and can be locked through the first locking member after being moved, thus to expand the shooting height of the photographic apparatus. Besides, the second connecting member is rotationally connected with the first connecting member, the first connecting member is connected with the first adjusting rod, the second connecting member is movably connected with the second adjusting rod, so that the angle between the second adjusting rod and the first adjusting rod can be adjusted, thus to expand the shooting angles of the stand for the photographic apparatus. Therefore, the stand for photographic apparatus has a wider application range, and more shooting angles and various shooting heights can be achieved after the photographic apparatus is installed on the stand for the photographic apparatus.

The additional aspects and advantages according to the embodiments of the present invention are illustrated in the following descriptions and partly become apparent from the following description or become known through the practice of the embodiments of the present application.

BRIEF DESCRIPTION OF THE DRAWINGS

The above and/or additional aspects and advantages of the present invention will become apparent and easy to understand from the description of the embodiments in combination with the following drawings, wherein.

Figure 1:
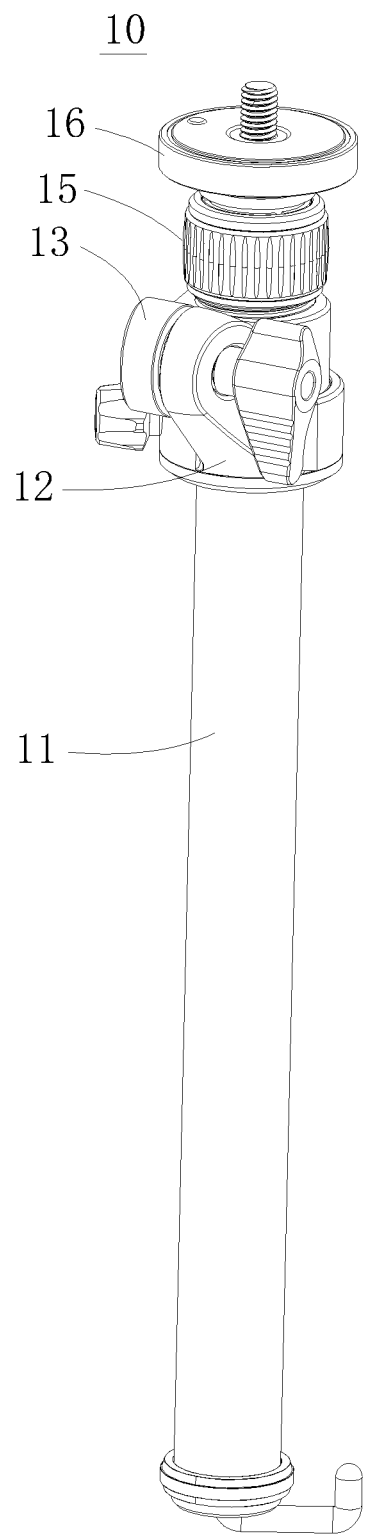
FIG. 1 is a schematic structural view of an adjusting structure according to an embodiment of the present invention.

Reference numbers in the drawings are:
adjusting structure 10; first adjusting rod 11; receiving cavity 111; first connecting member 12; first body 121; second mounting hole 1211; first boss 122; first connecting hole 1221; first meshing tooth 1222; second connecting member 13; second body 131; first mounting hole 1311; second boss 132; second connecting hole 1321; second meshing tooth 1322; second adjusting rod 14; first locking member 15; hand wheel 151; locking piece 152;

supporting member 16; supporting body 161; stud 162; second locking member 17; third connecting member 18; third mounting hole 181; main body 182; retaining ring 183; connecting assembly 19; connecting pin 191; locking knob 192; spring 193;

connecting base 20; mounting slot 201; adapter 21; sphere 211; rod body 212; supporting platform 22; third locking member 23; stand for photographic apparatus 100.

DETAILED DESCRIPTION OF EMBODIMENTS

The embodiments of the present invention are further explained below in conjunction with the accompanying drawings. The same or similar reference numbers in the accompanying drawings represent the same or similar components or components with the same or similar functions from beginning to end.

In addition, the embodiments of the present invention described below in conjunction with the accompanying drawings are exemplary and intended only to explain the embodiments of the present invention, but cannot be understood as limitation to the present application.

In the present application, unless otherwise expressly provided and defined, a first feature being "on" or "under" a second feature can be interpreted as that the first feature is directly in contact with the second feature, or the first feature is indirectly in contact with the second feature through an intermediate medium. Moreover, the first feature being "above" and "over" the second feature can be interpreted as that the first feature is directly above or obliquely above the second feature, or can be interpreted simply as that a level height of the first feature is higher than that the second feature. The first feature being "below" and "underneath" the second feature can be interpreted as that the first feature is directly below or obliquely below the second feature, or can be interpreted simply as that a level height of the first feature is less than that of the second feature.

Figure 2:
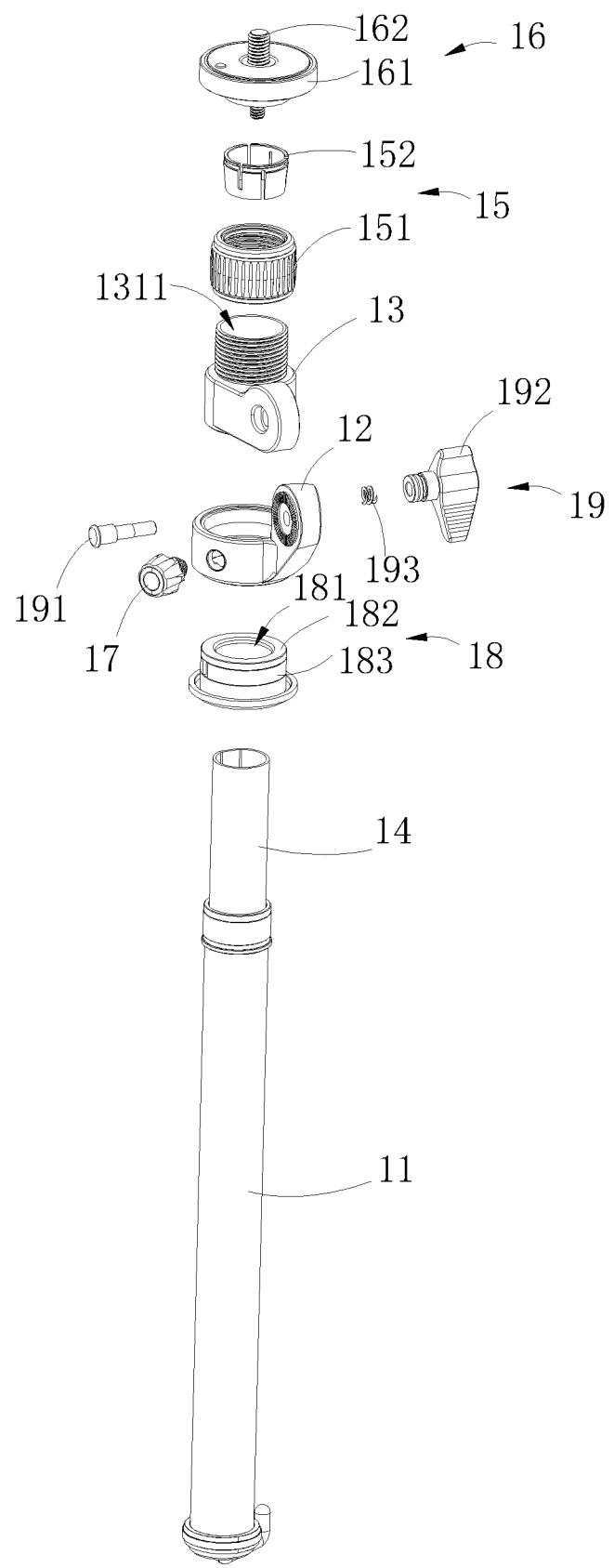
FIG. 2 is a schematic structure-exploded view from one perspective of the adjusting structure according to the embodiment of the present invention.
Figure 3:
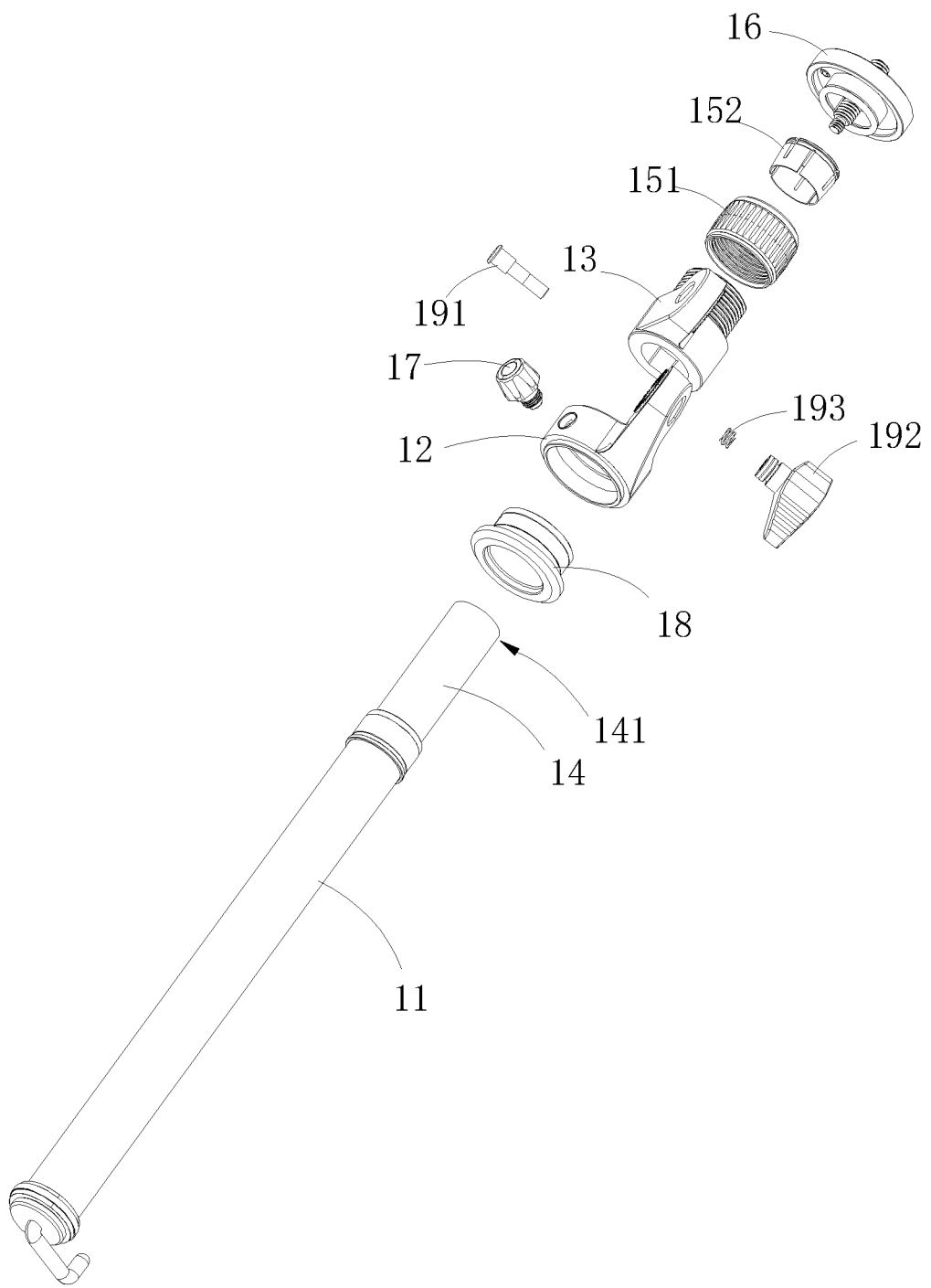
FIG. 3 is a schematic structure-exploded view from another perspective of the adjusting structure according to the embodiment of the present invention.

Please refer to FIG. 1 to FIG. 3, an adjusting structure 10 of the embodiment in the present invention is used in stand for photographic apparatus. The adjusting structure 10 includes a first adjusting rod 11, a first connecting member 12, a second connecting member 13, a second adjusting rod 14, a first locking member 15 and a supporting member 16. The first connecting member 12 is fixedly connected with the first adjusting rod 11, the second connecting member 13 is rotationally connected with the first connecting member 12 and provided with a first mounting hole 1311. The second connecting member 13 is rotatable relative to the first connecting member 12 so as to adjust an included angle with the first connecting member 12. The second adjusting rod 14 passes through the first mounting hole 1311 and movably connected with the second connecting member 13, and is movable relative to the first adjusting rod 11 along a straight direction. The first locking member 15 is connected with the second connecting member 13 for locking the second adjusting rod 14 so as to limit the second adjusting rod 14 to move along the straight direction. The supporting member 16 is connected to one end 141 of the second adjusting rod 14 away from the first adjusting rod 11.

In the adjusting structure 10 of the present invention, the second adjusting rod 14 is movable relative to the first adjusting rod 11 along a straight direction, and can be locked through the first locking member 15 after being moved, which extends the shooting height of the photographic apparatus. Besides, the second connecting member 13 is rotationally connected with the first connecting member 12, the first connecting member 12 is connected with the first adjusting rod 11, and the second connecting member 13 is movably connected with the second adjusting rod 14, thus the angle between the second adjusting rod 14 and the first adjusting rod 11 can be adjusted, which extends the shooting angle of the stand for the photographic apparatus 100. Therefore, the stand for photographic apparatus with the adjusting structure 10 has a wider application range, and more shooting angles and various shooting heights can be achieved after the photographic apparatus is arranged on the stand for the photographic apparatus 100.

Specifically, the adjusting structure 10 of the present invention is mainly used to adjust the shooting angles and shooting heights of cameras, video cameras, mobile phones and other photographic apparatus placed on the adjusting structure 10, thus to meet the shooting needs. The adjusting structure 10 includes the first adjusting rod 11, the first connecting member 12, the second connecting member 13, the second adjusting rod 14, the first locking member 15 and the supporting member 16.

Please continue to refer to FIGS. 1 to 3, the first adjusting rod 11 can be a tubular structure, specifically a circular tube or a square tube, which is not limited hereon. A receiving cavity 111 is formed in the first adjusting rod 11. The first connecting member 12 can be fixedly connected with the first adjusting rod 11, such as by welding, bonding, screws, bolts, etc. Specifically, the first connecting member 12 includes a first body 121 and a first boss 122, wherein the first body 121 is provided with a second mounting hole 1211, one end of the first adjusting rod 11 is extended into the second mounting hole 1211 and fixedly connected with the first body 121. More specifically, the first body 121 is further provided with a first locking hole which penetrates through a side wall of the first body 121 and communicates with the second mounting hole 1211. The adjusting structure 10 further includes a second locking member 17. The second locking member 17 can pass through the first locking hole and then be in contact with the first adjusting rod 11. The first connecting member 12 is fixedly connected with the first adjusting rod 11 by tightening the second locking member 17, and the first adjusting rod 11 is disconnected with the first connecting member 12 by loosening the second locking member 17, wherein the second locking member 17 may be a locking screw.

Further, the adjusting structure 10 further includes a third connecting member 18, which is located in the second mounting hole 1211 and located between the first connecting member 12 and the first adjusting rod 11. Specifically, the third connecting member 18 is provided with a third mounting hole 181, the first adjusting rod 11 is extended into the third mounting hole 181. The second locking member 17 can be in contact with the third connecting member 18 after penetrating through the first locking hole, or a locking hole that communicates with the third mounting hole 181 is formed on the third connecting member 18, and the second locking member 17 is in contact with the first adjusting rod 11. The third connecting member 18 includes a main body 182 and a retaining ring 183. The main body 182 is provided with the third mounting hole 181. The main body 182 has an inverted T-shaped structure and a groove is formed at the bottom, and an annular groove is form on the waist of the main body 182. The first connecting member 12 is mounted within the groove of the main body 182, the two retaining rings 183 are mounted within the annular groove, and gaps are formed corresponding to the first locking hole. The second locking member 17 can penetrates through the first locking hole and then extends into the gap. In this way, the connection between the first connecting member 12 and the first adjusting rod 11 is tighter, and the first connecting member 12 is not easy to move relative to the first adjusting rod 11.

Certainly, in other embodiments, the second locking member 17 and the first adjusting rod 11 can also be fixed by other means, which is not limited here.

Figure 4:
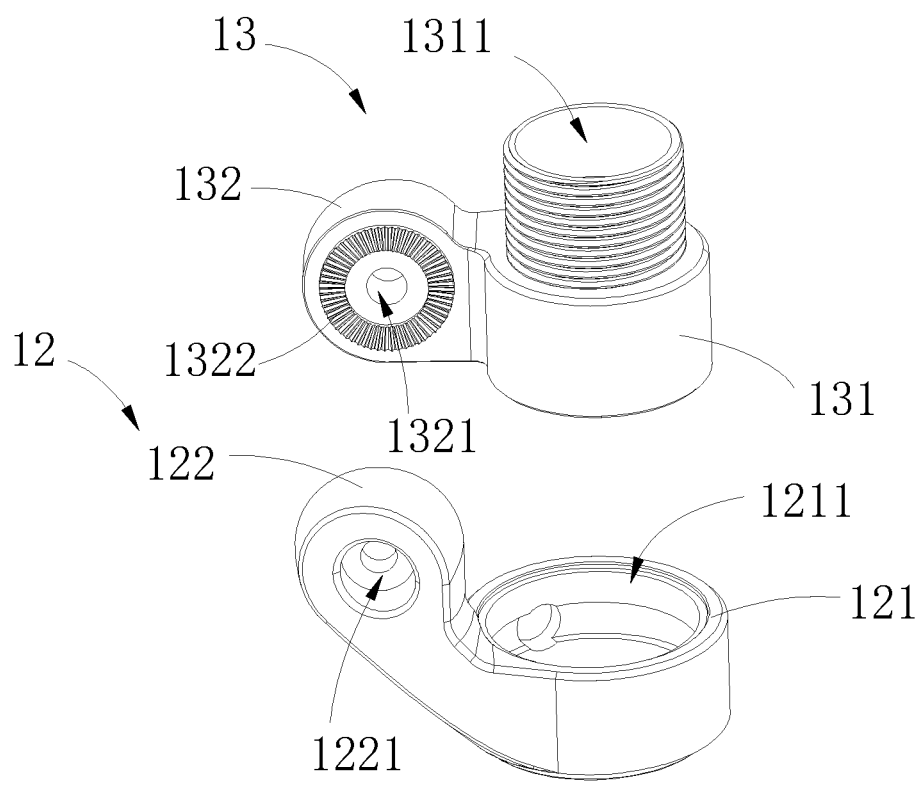
FIG. 4 is a schematic structural view of a first connecting member and a second connecting member of the adjusting structure from one perspective according to the embodiment of the present invention.
Figure 5:
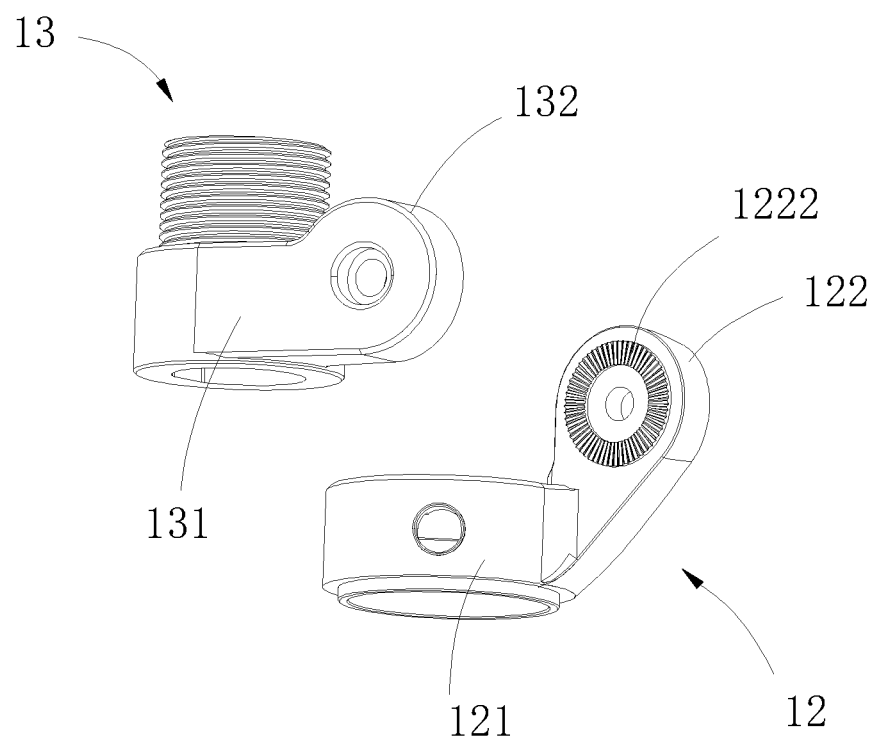
FIG. 5 is a schematic structural view of the first connecting member and the second connecting member of the adjusting structure from another perspective according to the embodiment of the present invention.

Please refer to FIG. 4 and FIG. 5, the first boss 122 is extended from the first body 121 toward a direction away from the first body 121. The first boss 122 is provided with a first connecting hole 1221, and the first connecting hole 1221 penetrates through the first boss 122. Furthermore, the first boss 122 may be extended obliquely upward so that a rotational angle between the first connecting member 12 and the second connecting member 13 can be larger.

Please refer to FIG. 1 to 7, the second connecting member 13 is rotationally connected with the first connecting member 12, the second connecting member 13 is rotatable relative to the first connecting member 12 with a joint of the two as a rotational axis, so that an angle between the second connecting member 13 and the first connecting member 12 changes. The second connecting member 13 includes a second body 131 and a second boss 132. The second body 131 is provided with a first mounting hole 1311, and one end of the second adjusting rod 14 penetrates through the first mounting hole 1311 and extends into the first adjusting rod 11. A size of the second body 131 can be the same as that of the first body 121 or smaller than that of the first body 121. In one embodiment, an external size of the second body 131 is smaller than that of the first body 121. A placing slot is formed on a side of the first body 121 towards the second body 131. A bottom of the second body 131 can be placed within the placing slot (as shown in FIG. 1). The placing slot can limit the second body 131 to move, thus to prevent the second body 131 from moving left and right.

Furthermore, the second boss 132 extends from the second body 131 toward a circumferential lateral side of the second body 131, and the second boss 132 can be connected to the first boss 122, so that the second connecting member 13 is rotationally connected with the first connecting member 12. Specifically, the second boss 132 is provided with a second connecting hole 1321 penetrating thereon, and the adjusting structure 10 also include a connecting assembly 19. The connecting assembly 19 penetrates through the first connecting hole 1221 on the first boss 122 and the second connecting hole 1321 on the second boss 132 to realize the rotational connection between the first boss 122 and the second boss 132. The connecting assembly 19 includes a connecting pin 191, a locking knob 192 and a spring 193.

The connecting pin 191 includes a first end and a second end. The first end of the connecting pin 191 penetrates through the first connecting hole 1221 and the second connecting hole 1321, and then is connected to the locking knob 192. The spring 193 is arranged in the first connecting hole 1221 or the second connecting hole 1321, or the spring 193 is partly located in the first connecting hole 1221 and partly located in the second connecting hole 1321. The spring 193 is sleeved on the connecting pin 191. In one embodiment, the second end of the connecting pin 191 is in contact with a side of the second boss 132 away from the first boss 122, and the locking knob 192 is in contact with a side of the first boss 122 away from the second boss 132. In another embodiment, the second end of the connecting pin 191 is in contact with a side of the first boss 122 away from the second boss 132, and the locking knob 192 is in contact with a side of the second boss 132 away from the first boss 122. In this way, the first boss 122 and the second boss 132 can be discharged or tightly locked by rotating the locking knob 192, and an angle between the first connecting member 12 and the second connecting member 13 can be adjusted after the locking relationship is discharged. After adjusting to an appropriate angle, the locking knob 192 is rotated and locked. The spring 193 acts as a buffer and helps in the process of tightening and loosening.

Certainly, in other embodiments, the connecting manners between the first connecting member 12 and the second connecting member 13 can also be other structures, which is not limited here.

Furthermore, since the adjusting structure 10 generally carries a camera, the camera has a certain weight, in order to avoid relative displacement between the first connecting member 12 and the second connecting member 13, it is necessary to tightly lock the first connecting member 12 and the second connecting member 13 or to increase the friction between the first connecting member 12 and the second connecting member 13. In some embodiments, in conjunction with FIG. 4 and FIG. 5, a first meshing tooth 1222 is formed on a surface of the first boss 122 facing to the second boss 132, a second meshing tooth 1322 is formed on a surface of the second boss 132 facing to the first boss 122, and the first meshing tooth 1222 is matched with the second meshing tooth 1322 (e.g. mutually meshed) to tightly lock the first connecting member 12 and the second connecting member 13. In this way, the first connecting member 12 and the second connecting member 13 is not easy to loosen, which ensures the stability when the adjusting structure 10 is in use, wherein the amount and shape of the first meshing tooth 1222 and the second meshing tooth 1322 are not limited here. The first meshing tooth 1222 and the second meshing tooth 1322 can be provided on the whole surface or can be provided on partial areas on the surface, which is not limited here.

In other embodiments, a first friction plate is provided on the surface of the first boss 122 facing to the second boss 132, and a second friction plate is provided on the surface of the second boss 132 facing to the first boss 122. The first friction plate is matched with the second friction plate to increase a friction force between the first connecting member 12 and the second connecting member 13. Therefore, the friction force between the first connecting member 12 and the second connecting member 13 is large and not easy to loosen, which ensures the stability when the adjusting structure 10 is in use. The specific types of the first friction plate and the second friction plate are not limited here; the first friction plate and the second friction plate can be provided on the whole surface, or can be provided on partial areas on the surface, which is not limited here.

Certainly, in other embodiments, other ways can also be used to tightly lock the first connecting member 12 and the second connecting member 13, or used to increase the friction force between the first connecting member 12 and the second connecting member 13, which is not limited here.

Figure 6:
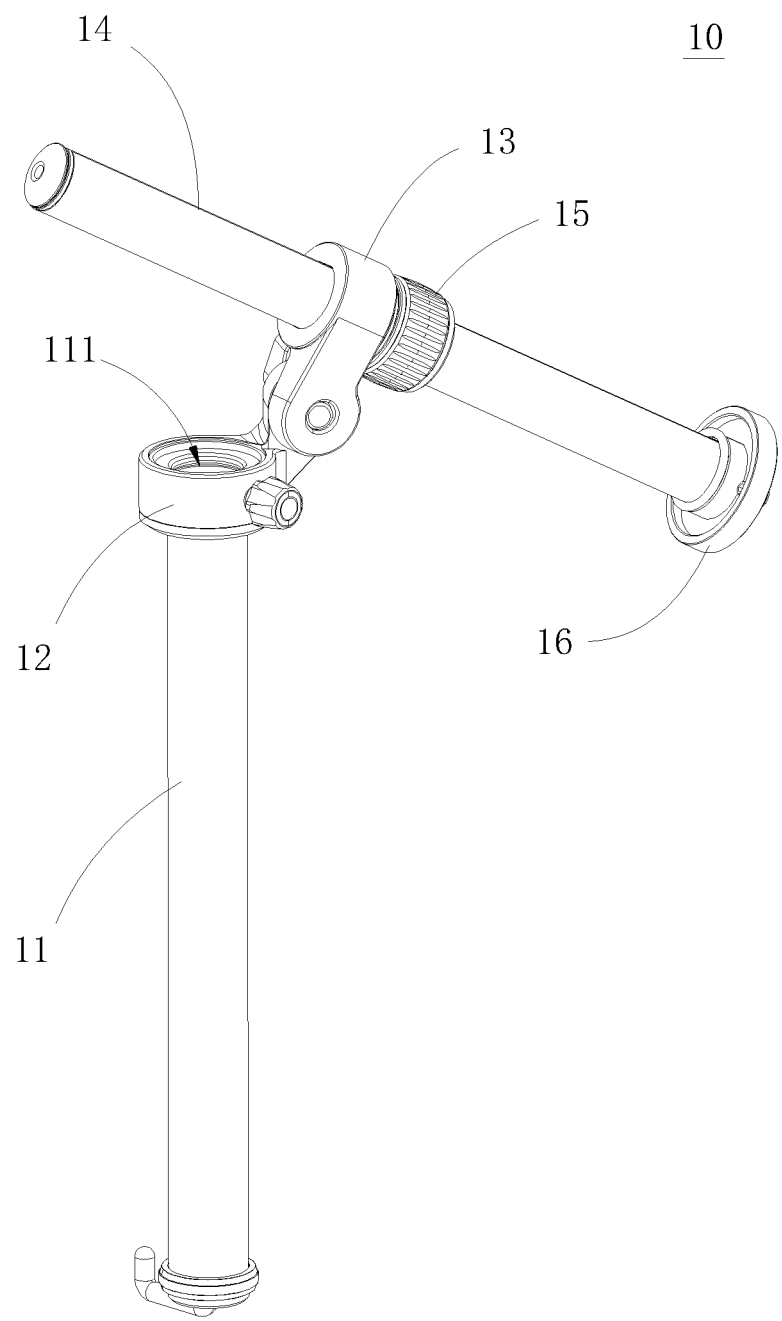
FIG. 6 is a schematic view of the adjusting structure under one using state according to the embodiment of the present invention.
Figure 7:
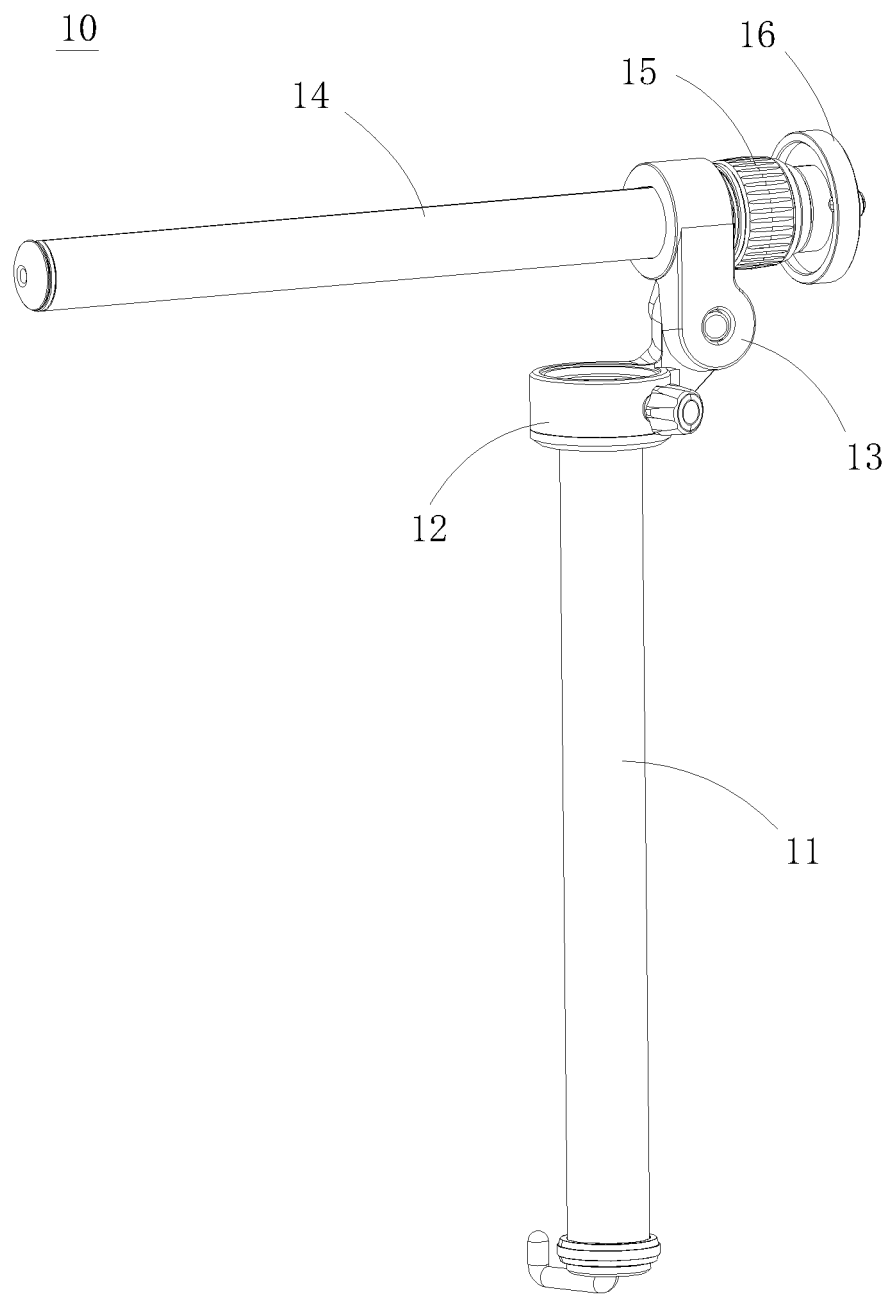
FIG. 7 is a schematic view of the adjusting structure under another using state according to the embodiment of the present invention.
Figure 8:
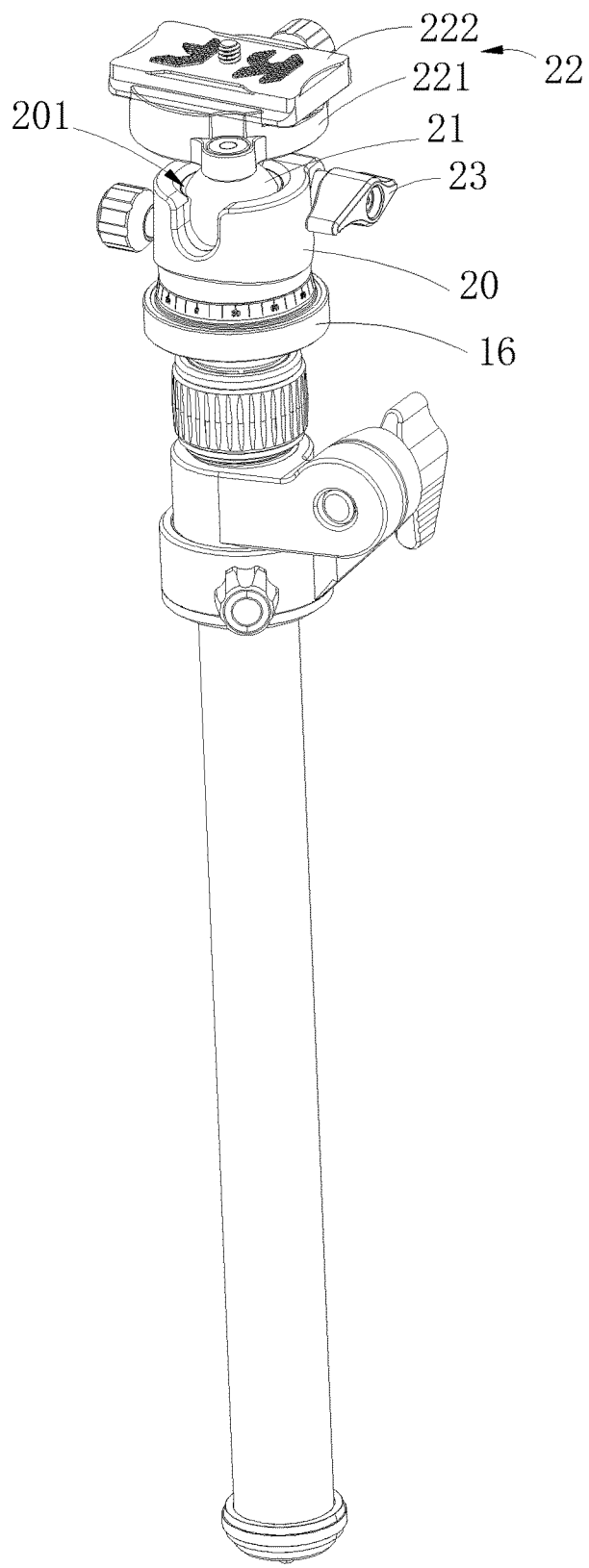
FIG. 8 is a schematic structural view of the adjusting structure with a supporting platform according to the embodiment of the present application.

Please refer to FIG. 6 to FIG. 8, the second adjusting rod 14 is movably connected with the second connecting member 13 and can be extended into the receiving cavity 111 of the first adjusting rod 11, and is movably connected with the first adjusting rod 11. The second regulating rod 14 can be moved relative to the second connecting member 13 and the first adjusting rod 11 along the straight direction. After the second adjusting rod 14 is adjusted, the second adjusting rod 14 and the second connecting member 13 can be fixed by the first locking member 15.

In some embodiments, the first locking member 15 includes a hand wheel 151 and a locking piece 152. The hand wheel 151 is connected with the second connecting member 13 by thread. The locking piece 152 is located within the first mounting hole 1311 of the second connecting member 13 and is located between the second connecting member 13 and the second adjusting rod 14. A top end of the locking piece 152 is in contact with a top end of the hand wheel 151, and a slot between the locking piece 152 and the second adjusting rod 14 can be adjust by rotating the hand wheel 151. Specifically, an outer side of the second connecting member 13 is provided with external threads, the hand wheel 151 is provided with a through hole, and an inner surface of the through hole is provided with internal threads. The hand wheel 151 is connected with the second connecting member 13 by matching the internal threads with the external threads. The locking piece 152 is located within the second connecting member 13 and sleeved on the second adjusting rod 14, and is in contact with inner side of the hand wheel 151. A gap between the locking piece 152 and the second adjusting rod 14 can be reduced or increased by rotating the hand wheel 151, thus a connection between the second adjusting rod 14 and the second connecting member 13 can be achieved by rotating the hand wheel 151, which is convenient to operate. A friction structure is provided on an outer surface of the hand wheel 151, which facilitates users to operate the hand wheel 151.

In other embodiments, a second locking hole communicating with the first mounting hole 1311 is formed on the second connecting member 13, the first connecting member is a locking screw, and the locking screw penetrates through the second locking hole to lock the second connecting member 13 and the second adjusting rod 14. It could be understood that the second connecting member 13 is provided with the second locking hole that penetrates the side wall of the second connecting member 13, and the locking screw penetrates through the second locking hole to lock the second connecting member 13 and the second adjusting rod 14. The connection between the second connecting member 13 and the second adjusting rod 14 may be changed by adjusting the locking screw. Certainly, the locking screw can be directly in contact with the second adjusting rod 14, or other components can be arranged between the second connecting member 13 and the second adjusting rod 14, thus the locking screw is not directly in contact with the second adjusting rod 14, which can avoid damage to the second adjusting rod 14 due to direct contact.

In some other embodiments, the second connecting member 13 includes a first clamping arm and a second clamping arm. The first clamping arm and the second clamping arm are located on both sides of the second adjusting rod 14, respectively. One end of the first clamping arm is connected with one end of the second clamping arm, the other ends of both the first clamping arm and the second clamping arm are provided with third locking holes. The first locking member is a locking screw, and the locking screw penetrates through the two third locking holes to tightly lock the first clamping arm and the second clamping arm. Specifically, a body of the second connecting member 13 includes the first clamping arm and the second clamping arm. Both the first clamping arm and the second clamping arm are connected with the second boss 132, and a distance between the first clamping arm and the second clamping arm is changed by adjusting the locking screw, so that the first clamping arm and the second clamping arm can clamp or loosen the second adjusting rod 14. Certainly, the first clamping arm and the second clamping arm can be directly in contact with the second adjusting rod 14, or other components can be arranged between the first clamping arm and the second adjusting rod 14, and between the second clamping arm and the second adjusting rod 14, thus the first clamping arm and the second clamping arm are not directly in contact with the second adjusting rod 14, which can avoid damage to the second adjusting rod 14 due to direct contact.

Please refer to FIG. 1 to FIG. 3, the supporting member 16 is fixedly connected with the second adjusting rod 14, the supporting member 16 is used to support a cloud platform, or directly support a camera, a mobile phone, etc, which is not limited here. Specifically, the supporting member 16 includes a supporting body 161 and a stud 162. The supporting body 161 is provided with a through hole, the stud 162 is connected with the second adjusting rod 14 after passing through the through hole, or the supporting body 161 is directly and fixedly connected with the second adjusting rod 14 by means of bonding, welding, etc. One end of the stud 162 is extended out of the supporting body 161, and the cloud platform can be connected with this end of the stud 162.

Please refer to FIG. 6 and FIG. 7, which show two different states of the adjusting structure 10. The state shown in FIG. 6 can be adjusted into the state shown in FIG. 7, and the state shown in FIG. 7 can also be adjusted into the state shown in FIG. 6. When the adjusting structure 10 is in use, if only the height needs to be adjusted, only a length of the second adjusting rod 14 extending from the first adjusting rod 11 needs to be adjusted. If the angle needs to be adjusted, the second adjusting rod 14 needs to be first pulled out of the first adjusting rod 11, then loosen the locking knob 192 and adjust the angle between the second connecting member 13 and the first connecting member 12. When an appropriate angle (such as the two angles shown in FIG. 6 and FIG. 7) is adjusted to, tighten the locking knob 192, the second adjusting rod 14 can also be sequentially adjusted to change a length of the second adjusting rod 14 extending from the second connecting member 13. In one embodiment, a range of angle adjustment of the second adjusting rod 14 may be 0° to 270°.

Furthermore, please refer to FIG. 8, in order to adjust more angles, the adjusting structure 10 further includes a connecting base 20, an adapter 21, and a supporting platform 22. The connecting base 20 is connected with a side of the supporting member 16 away from the second adjusting rod 14. The connecting base 20 can be connected with the stud 162 or the connecting base 20 can be connected with the supporting member 16 by bonding or the methods. The connecting base 20 is further provided with a mounting slot 201, whose inner surface can be a spherical surface. The adapter 21 can be amounted in the mounting slot 201 and can be rotatable relative to the connecting base 20, and a rotation direction of the adapter 21 can be different from that of the second connecting member 13. Specifically, the adapter 21 includes a sphere 211 and a rod body 212 (shown in FIG. 10), the sphere 211 is connected with the connecting base 20 and located in the mounting slot 201 and can be rotated within the mounting slot 201, and the rod body 212 is connected with the sphere 211 and extends out of the mounting slot 201. The supporting platform 22 is connected with the rod body 212, and can be rotated together under the action of the sphere 211, so that the supporting platform 22 can be adjusted into different poses, which fully expands a range of shooting angle of the camera.

A third locking member 23 for locking the adapter 21 and the connecting base 20 is also provided in some embodiments, which can tightly lock the adapter 21 and the connecting base 20 after adjusting the direction, thus to make the shooting more stable. Furthermore, the supporting platform 22 can include a base 221 and a silicone pad 222 placed on the base 221. The silicone pad 222 can act as a cushion and play a better role in shock absorption, so that the camera placed on the supporting platform 22 is more stable.

Figure 9:
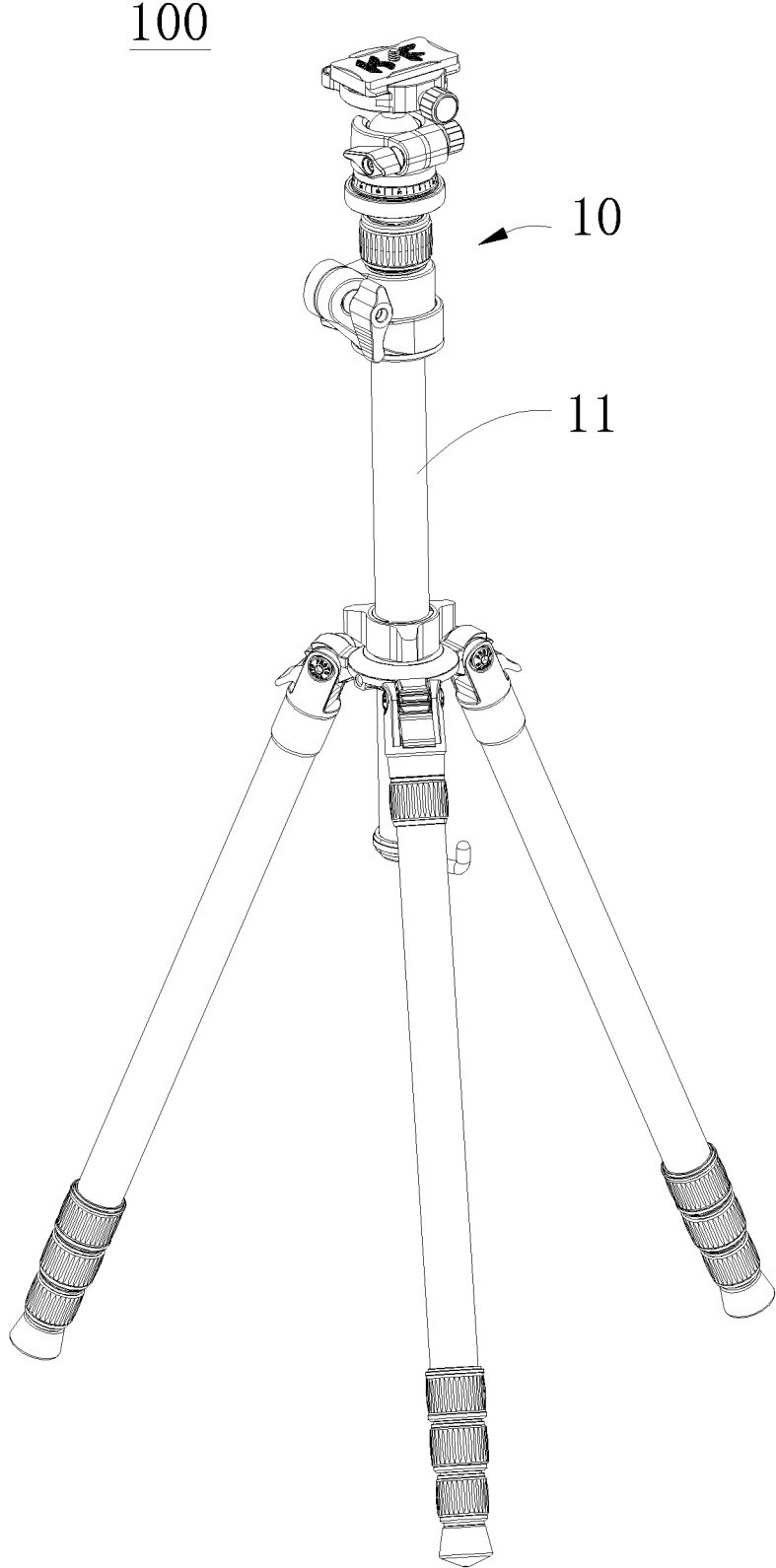
FIG. 9 is a schematic structural view of a stand for photographic apparatus according to the embodiment of the present invention.
Figure 10:
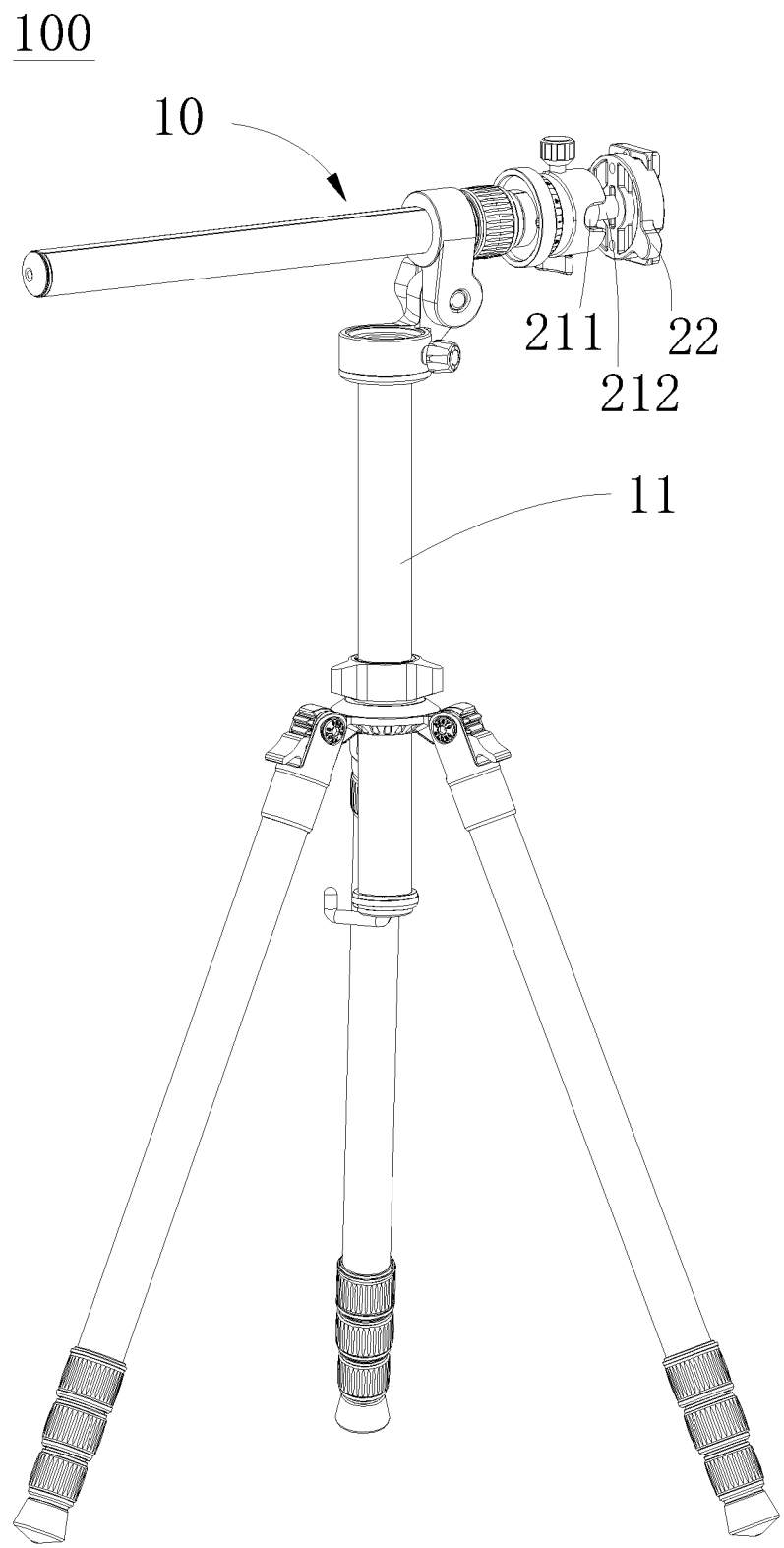
FIG. 10 is a schematic view of the stand for photographic apparatus under one using state according to the embodiment of the present invention.

Please refer to FIGS. 9 and 10, the present invention further provides a stand 100 for photographic apparatus, which is used to support the photographic apparatus. The stand 100 includes a main stand and the adjusting structure 10 described in any of the above embodiments. The adjusting structure 10 is installed on the main stand. Specifically, the main stand can be a tripod, and the first adjusting rod 11 of the adjusting structure 10 can be movably or fixedly installed on the tripod. Certainly, the main support can also be four-legged support, five-legged support, etc., which is not limited here. It can be seen from FIG. 9 and FIG. 10 that the stand 100 for photographic apparatus under two use states can meet different shooting needs respectively.

In summary, in the adjusting structure 10 and the stand 100 for photographic apparatus of the present invention, the second adjusting rod 14 is movable relative to the first adjusting rod 11 along a straight direction, and can be locked through the first locking member 15 after being moved, thus to expand the shooting height of the photographic apparatus. Besides, the second connecting member 13 is rotationally connected with the first connecting member 12, the first connecting member 12 is connected with the first adjusting rod 11, and the second connecting member 13 is movably connected with the second adjusting rod 14, so that the angle between the second adjusting rod 14 and the first adjusting rod 11 can be adjusted, thus to expand the shooting angles of the stand 100 for photographic apparatus. Therefore, the stand 100 for photographic apparatus has a wider application range, and more shooting angles and various shooting heights can be achieved after the photographic apparatus is installed on the stand 100 for the photographic apparatus.

In the description of the present specification, the description of reference terms "certain embodiments", "one embodiment", "some embodiments", "indicative embodiments", "examples", "specific examples", or "some examples" mean that the specific features, structures, materials or characteristics described in conjunction with the embodiments or examples are included in at least one embodiments or examples of the present application. In the present specification, indicative expressions of the above terms do not necessarily refer to the same embodiments or examples. Furthermore, the specific features, structures, materials, or characteristics described can be combined in an appropriate manner in any one or more embodiments or examples.

Furthermore, the terms "first" and "second" are used only for descriptive purposes and cannot be understood to indicate or imply relative importance or to indicate implicitly the number of technical features indicated. Therefore, the features defined as "first" and "second" features may explicitly or implicitly include at least one of the described features. In the description of the present invention, "plurality" means at least two, such as two, three, unless otherwise specifically defined.

Although the embodiments of the present invention have been illustrated and described, it is understandable that the above embodiments are exemplary and cannot be understood as restrictions on the present application. Those skilled in the art can change, modify, replace and substitute the above embodiments within the scope of the present application, and the scope of the present application is defined by the claims and its equivalents.

The invention claimed is:

1. An adjusting structure (10), used for a stand (100) for photographic apparatus, characterized in that the adjusting structure (10) comprises:
a first adjusting rod (11);
a first connecting member (12), which is fixedly connected with the first adjusting rod (11);
a second connecting member (13), which is rotationally connected with the first connecting member (12) and is provided with a first mounting hole (1311), wherein the second connecting member (13) is rotatable relative to the first connecting member (12) to adjust an angle relative to the first connecting member (12);
a second adjusting rod (14), which penetrates through the first mounting hole (1311) and is movablely connected with the second connecting member (13), and movable relative to the first adjusting rod (11) along a straight direction;
a first locking member (15), which is connected with the second connecting member (13) for locking the second adjusting rod (14) so as to limit the second adjusting rod (14) to move along the straight direction; and
a supporting member (16), which is connected to an end of the second adjusting rod (14) away from the first adjusting rod (11).

2. The adjusting structure (10) according to claim 1, characterized in that the adjusting structure (10) further comprises a second locking member (17), and the first connecting member (12) includes:
a first body (121), which is provided with a second mounting hole (1211) and a first locking hole communicating with the second mounting hole (1211), wherein one end of the first adjusting rod (12) is extended into the second mounting hole (1211), and the second locking member (17) penetrates through the first locking hole for locking the first adjusting rod (12) and the first body (121);
and a first boss (122) extending from the first body (121), which is provided with a first connecting hole (1221) for connecting with the second connecting member (13).

3. The adjusting structure (10) according to claim 2, characterized in that the adjusting structure (10) further includes a connecting assembly (19), and the second connecting member (13) includes:
a second body (131), which is provided with the first mounting hole (1311); and
a second boss (132) extending from the second body (131), which is provided with a second connecting hole (1321);
wherein the connecting assembly (19) penetrates through the first connecting hole (1221) and the second connecting hole (1321) and connects the first boss (122) with the second boss (132) rotationally.

4. The adjusting structure (10) according to claim 3, characterized in that the connecting assembly (19) includes:
a connecting pin (191), comprising a first end and a second end, wherein the first end of the connecting pin (191) penetrates through the first connecting hole (1221) and the second connecting hole (1321);
a locking knob (192), which is connected with the first end of the connecting pin (191); and
a spring (193), which is arranged in the first connecting hole (1221) or the second connecting hole (1321) and is sleeved on the connecting pin (191);
wherein the second end of the connecting pin (191) is in contact with a side of the second boss (132) away from the first boss (122), and the locking knob (192) is in contact with a side of the first boss (122) away from the second boss (132); or, the second end of the connecting pin (191) is in contact with a side of the first boss (122) away from the second boss (132), and the locking knob (192) is in contact with a side of the second boss (132) away from the first boss (122).

5. The adjusting structure (10) according to claim 3, characterized in that a first meshing tooth (1222) is formed on a surface of the first boss (122) facing to the second boss (132), a second meshing tooth (1322) is formed on a surface of the second boss (132) facing to the first boss (122), and the first meshing tooth (1222) is matched with the second meshing tooth (1322) for locking the first connecting member (12) and the second connecting member (13); or
a first friction plate is provided on the surface of the first boss (122) facing to the second boss (132), a second friction plate is provided on the surface of the second boss (132) facing to the first boss (122); and the first friction plate is matched with the second friction plate for increasing a friction force between the first connecting member (12) and the second connecting member (13).

6. The adjusting structure (10) according to claim 1, characterized in that the first locking member (15) includes a hand wheel (151) and a locking piece (152), the hand wheel (151) is connected with the second connecting member (13) by a thread, the locking piece (152) is arranged within the first mounting hole (1311) of the second connecting member (13) and is located between the second connecting member (13) and the second adjusting rod (14); a top end of the locking piece (152) is in contact with a top end of the hand wheel (151), and a gap between the locking piece (152) and the second adjusting rod (14) is adjusted by rotating the hand wheel (151); or
a second locking hole communicating with the first mounting hole (1311) is formed on the second connecting member (13), the first locking member is a locking screw, and the locking screw penetrates through the second locking hole and locks the second connecting member (13) and the second adjusting rod (14); or
the second connecting member (13) includes a first clamping arm and a second clamping arm located on both sides of the second adjusting rod (14), one end of the first clamping arm is connected with one end of the second clamping arm, and an other end of both the first and second clamping arm is provided with a third locking hole; the first locking member is a locking screw, and the locking screw passes through the two third locking holes and locks the first clamping arm and the second clamping arm.

7. The adjusting structure (10) according to claim 1, characterized in that the second mounting hole (1211) is formed on the first connecting member (12), the adjusting structure (10) further comprises a third connecting member (18), the third connecting member (18) is arranged within the second mounting hole (1211) and is provided with a third mounting hole (181), the first adjusting rod (11) penetrates the third mounting hole (181).

8. The adjusting structure (10) according to claim 1, characterized in that the supporting member (16) comprises a supporting body (161) and a stud (162), the supporting body (161) is fixedly connected with the second adjusting rod (13), and the stud (162) is extended out of the supporting body (161).

9. The adjusting structure (10) according to claim 1, characterized in that the adjusting structure (10) further comprises:
- a connecting base (20), which is arranged on a side of the supporting member (16) away from the second adjusting rod (14) and is provided with a mounting slot (201);
- an adapter (21), which includes a sphere (211) and a rod body (212), wherein the sphere (211) is arranged into the mounting slot (201) and rotatable relative to the connecting base (20), the rod body (212) is connected with the sphere (211), and
- a supporting platform (22), which is connected with the rod body (212).

10. A stand (100) for photographic apparatus, a comprising: a main stand and an adjusting structure (10), wherein the adjusting structure (10) is installed on the main stand; the adjusting structure (10) comprises:
- a first adjusting rod (11):
- a first connecting member (12), which is fixedly connected with the first adjusting rod (11);
- a second connecting member (13), which is rotationally connected with the first connecting member (12) and is provided with a first mounting hole (1311), wherein the second connecting member (13) is rotatable relative to the first connecting member 912) to adjust an angle relative to the first connecting member (12);
- a second adjusting rod (14), which penetrates through the first mounting hole (1311) and is movably connected with the second connecting member (13), and movable relative to the first adjusting rod (11) along a straight direction; and
- a first locking member (15), which is connected with the second connecting member (13) for locking the second adjusting rod 914) so as to limit the second adjusting rod 914) to move along the straight direction; and a supporting member (16), which is connected to an end of the second adjusting rod 914) away from the first adjusting rod (11).

\* \* \* \* \*